United States Patent [19]
Yopp

[11] Patent Number: 5,269,186
[45] Date of Patent: * Dec. 14, 1993

[54] APPARATUS AND METHOD FOR DETECTING ROTATIONAL IMBALANCE OF VEHICLE ROADWHEELS

[75] Inventor: Wilford T. Yopp, Canton, Mich.

[73] Assignee: Ford Motor Company, Dearborn, Mich.

[*] Notice: The portion of the term of this patent subsequent to Mar. 13, 2007 has been disclaimed.

[21] Appl. No.: 632,574

[22] Filed: Dec. 24, 1990

[51] Int. Cl.$^5$ .................................................. G01M 1/28
[52] U.S. Cl. ............................................................... 73/457
[58] Field of Search ...................... 73/457, 146, 862.04, 73/962.54; 340/438, 440

[56] References Cited

U.S. PATENT DOCUMENTS

| | | | |
|---|---|---|---|
| 2,720,638 | 10/1955 | Ritch, Jr. | 73/457 |
| 3,438,646 | 4/1969 | Hannapel | 340/438 |
| 3,526,873 | 9/1970 | Burt | 73/457 |
| 3,677,077 | 7/1972 | Merryman et al. | 73/146 |
| 3,688,589 | 9/1972 | Wilhelm | 73/457 |
| 3,744,321 | 7/1973 | Hauge | 73/457 |
| 4,023,404 | 5/1977 | Brendel | 73/146 |
| 4,171,641 | 10/1979 | Landsness | 73/146 |
| 4,458,535 | 1/1984 | Juergens | 340/438 |
| 4,463,936 | 8/1984 | Shinbori et al. | 180/141 |
| 4,470,260 | 10/1984 | Miller et al. | 180/132 |
| 4,719,445 | 1/1988 | Fremd | 340/438 |
| 4,907,452 | 3/1990 | Yopp | 73/457 |

Primary Examiner—John E. Chapman
Attorney, Agent, or Firm—Raymond L. Coppiellie; Roger L. May

[57] ABSTRACT

An apparatus for detecting dynamic rotational imbalance of vehicle roadwheel assemblies includes a force measurement sensor for sensing a combined force exerted between the surface upon which the vehicle is traveling and the vehicle sprung mass and further includes a device for generating a combined force signal corresponding to the sensed combined force. The apparatus further includes processor responsive to the combined force signal for determining the dynamic rotational balance condition of the roadwheel assembly.

20 Claims, 3 Drawing Sheets

APPARATUS AND METHOD FOR DETECTING ROTATIONAL IMBALANCE OF VEHICLE ROADWHEELS

BACKGROUND OF THE INVENTION

1. Field of the Invention

This invention relates generally to a vehicular apparatus for detecting rotational imbalance of the unsprung mass of a vehicle. More particularly, the present invention relates to an apparatus which utilizes a force sensor to dynamically determine the rotational imbalance of the vehicle unsprung mass.

2. Disclosure Information

A vehicle having one or more imbalanced roadwheel assemblies often suffers from the potential problems of excessive tire wear, misaligned wheel positions and degraded steering and handling characteristics. Often, a vehicle operator has no clear indication that any of the vehicle wheels are out of balance until significant problems have already developed, resulting in the repair or replacement of worn vehicle parts. Therefore, it would be beneficial to warn the vehicle operator if any of the vehicle roadwheel assemblies, both steered and nonsteered, are out of balance so that the imbalance may be corrected before permanent damage occurs. Furthermore, with the advent of active suspension systems, it is very important to detect whether any vehicle roadwheel assembly is out of balance so that the active suspension actuator does not continuously operate to dampen the vibrations due to the rotational imbalance and hence cause a loss of power and gas mileage to the vehicle.

My U.S. Pat. No. 4,907,452, assigned to the assignee of the present invention, discloses a system for dynamically detecting the rotational imbalance of the steerable roadwheel assemblies of a vehicle. The system utilizes a force sensor for measuring the force required to steer the steerable wheels of the vehicle in determining whether the wheels are imbalanced. That system suffers from the disadvantage that the rotational imbalance of some types of nonsteered wheels of the vehicle can not be measured. That system also presents a disadvantage to vehicles having active suspension systems in that the nonsteered wheels continuously create vibrations to the vehicle body caused by the rotational imbalance which the driver may never feel because the active suspension actuators dampen the vibrations. Furthermore, that system requires an additional steering force sensor not normally present in the vehicle. The present invention provides an improvement to the '452 system in that the present invention detects if any roadwheel assembly of the vehicle is out of balance. The present invention utilizes a force sensing device interposed between the sprung and unsprung masses of the vehicle to detect rotational imbalance of a roadwheel assembly. As used herein, "sprung mass" refers to the body or chassis of the vehicle while "unsprung mass" refers to the roadwheel assembly and associated rotating members.

Many systems have been proposed which detect abnormal conditions in the operating state of the vehicle roadwheel assemblies. For example, U.S. Pat. Nos. 2,720,638; 3,526,873; 3,744,321; and 4,458,535 all disclose systems utilizing vibration sensors to detect abnormalities in the vehicle wheel due to any number of conditions, such as a flat tire or low tire pressure. However, none of the systems teach or suggest any way to dynamically detect whether any of the vehicle roadwheel assemblies are rotationally imbalanced using a force sensor according to the present invention.

U.S. Pat. No. 4,463,936 discloses a system in which steering pressure is measured to indicate a vehicle operating condition wherein the leaves of a multileaf suspension spring will be clamped to change the damping characteristics of the suspension. U.S. Pat. No. 4,470,260 discloses a system in which hydraulic steering pressure is sensed and used as a control variable in a system which controls the kickback of an open center, load sensing hydraulic steering apparatus. None of the aforementioned patents discloses a system in which force is measured and employed in a system for determining the rotational imbalance of the vehicle roadwheel assemblies.

U.S Pat. No. 3,438,646 discloses a system for detecting alignment changes on a vehicle, but does not disclose detection of imbalance roadwheel assemblies. U.S. Pat. No. 4,719,445 discloses a system utilizing statistical methods to determine whether the position and motion of a steering linkage are correct. The system employs a single sensor on the steering linkage and does not measure force exerted between the road surface and the vehicle sprung mass as does the present invention.

It is an object of the present invention to provide a system which dynamically detects rotational imbalance of vehicle roadwheel assemblies so that corrective measures may be taken before the dynamic imbalance causes permanent damage to the vehicle.

It is an advantage of the present invention that a system according to this invention may be employed not only with conventional suspension systems but also with active and semi-active systems.

It is yet another advantage of a system according to the present invention that this invention may be employed for determining the absolute magnitude of a weight imbalance affecting both steered and nonsteered roadwheel assemblies and to diagnose the cause of the imbalance as originating in either the roadwheel assembly or its associated rotating members.

Other objects, features and advantages of the present invention will become apparent from the drawings, description and claims which follow.

SUMMARY OF THE INVENTION

There is disclosed herein an apparatus for detecting dynamic rotational imbalance of a roadwheel assembly of a vehicle having a sprung and unsprung mass. The apparatus comprises force measurement means for sensing a combined force exerted between the road upon which the vehicle is traveling and the sprung mass of the vehicle. The combined force may include forces due to the sprung mass of the vehicle, road surface inputs, the rotational imbalance of the roadwheel assembly and combinations thereof. The force measurement means further comprises means for generating a combined force signal corresponding to the combined force. The apparatus also includes processor means responsive to the combined force signal for determining the dynamic rotational balance condition of the roadwheel assembly.

In one embodiment, the processor means may comprise means for resolving the combined force signal into a base component corresponding to the forces due to either the sprung mass of the vehicle, the road surface inputs, or a combination thereof, and a variable component attributable to dynamic rotational imbalance of the roadwheel. The processor means may further comprise counter means for comparing the frequencies of said velocity signal and the variable component of said force signal, so that said force signal may be rejected by the processor as a spurious signal in the event that said frequencies are not within a common frequency tolerance band.

An apparatus according to the present invention may be used for measuring the absolute dynamic rotational imbalance of a roadwheel assembly if a signal corresponding to the forward velocity of the vehicle is fed back to the processor means so that the processor means is able to perform a calculation responsive to vehicle velocity as well as to the sensed combined force. It is possible to determine the absolute magnitude of roadwheel assembly imbalance by using vehicle speed because the amplitude of the combined force signal attributable to dynamic rotational imbalance of the roadwheel assembly is a function of the speed of the vehicle and the magnitude of the imbalance.

According to the present invention, a method for detecting dynamic imbalance of a roadwheel assembly vehicle having a sprung and unsprung mass comprises the steps of: (i) sensing the combined force exerted between the road upon which the vehicle is traveling and the sprung vehicle mass; (ii) generating a combined force signal having a magnitude corresponding to said sensed combined force; (iii) resolving said combined force signal into a base component attributable to the forces due either to the sprung mass of the vehicle, the road surface inputs, or a combination thereof, and a variable component attributable to dynamic rotational imbalance of the roadwheel assembly; (iv) comparing the magnitude of said variable force component to a threshold value; and (v) providing an imbalance signal in the event that said variable force component exceeds said threshold value.

DESCRIPTION OF THE PREFERRED EMBODIMENTS

Figure 1:
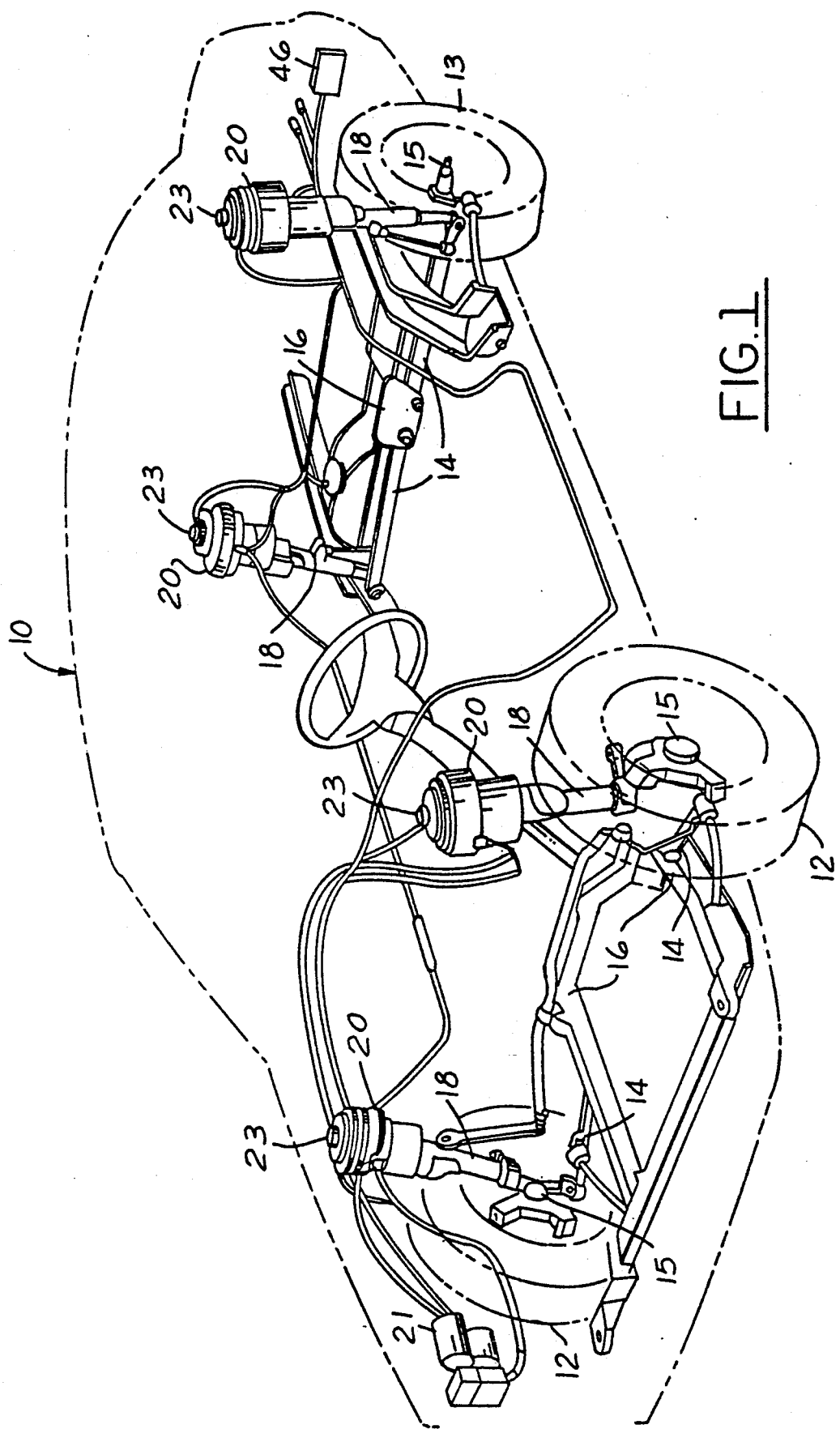
FIG. 1 is a perspective view of a motor vehicle incorporating an apparatus according to the present invention.
Figure 2:
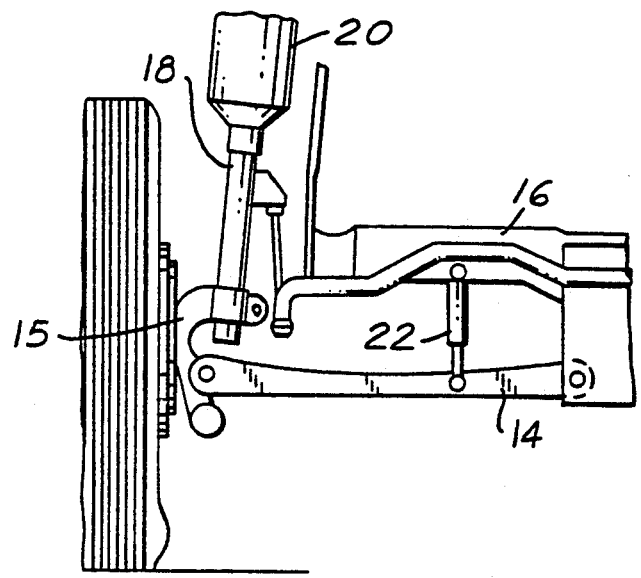
FIG. 2 is a frontal elevation of an automotive suspension equipped with a force measurement sensor according to the present invention.

As shown in FIGS. 1 and 2, a vehicle 10 is equipped with an apparatus according to the present invention. The vehicle 10 has front steerable roadwheel assemblies 12 and rear roadwheel assemblies 13. Each of the suspensions shown in FIGS. 1 and 2 includes a lower control arm 14 having an inboard end pivotally attached to the vehicle's chassis 16, and an outboard end pivotally attached to wheel carrier 15. As shown in FIG. 1, compressor 21 provides the suspension with compressed air, supplied to suspension units 20 in conventional fashion to adjust the ride height of the vehicle. It will become apparent to those skilled in the art that the present invention may be utilized with other known suspension configurations and systems, including active and semi-active systems. The present invention is not meant to be limited solely to the suspension illustrated in FIGS. 1 and 2.

Figures 3, 4:
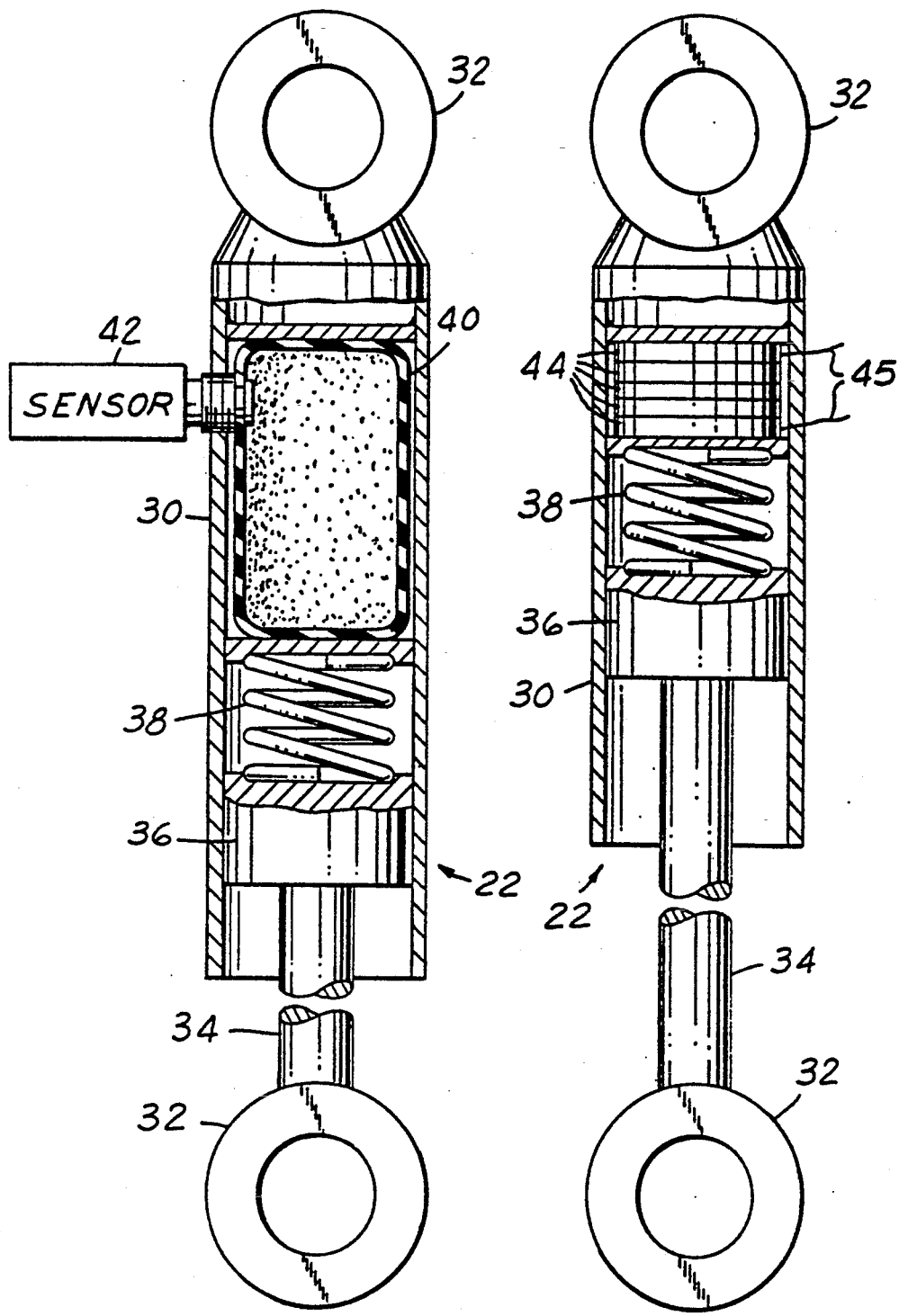
FIG. 3 is a broken away, partially schematic sectional view of a first embodiment of the sensor shown in FIG. 2.
FIG. 4 is a broken away, partially schematic sectional view of a second embodiment of the sensor shown in FIG. 2.

Each of the suspension units 20 of vehicle 10 in FIG. 1 includes a load cell 23 interposed between the suspension unit 20 and the sprung mass of the vehicle. The load cell measures the combined force exerted between the road upon which the vehicle travels and the sprung vehicle mass. The combined force is due to the combination of the sprung vehicle mass, the road surface inputs and the force due to the imbalance of the roadwheel assembly as the roadwheel assembly rotates as will be explained in greater detail below. The load cell 23 generates a signal proportional to this combined force which is then transmitted to a microprocessor controller 46 by means of electrical leads. Those skilled in the art will appreciate in view of this disclosure that other types of force sensors could be employed in the present invention. For example, force sensors employing piezoelectric crystals, strain guages or other types of devices could also be used. FIGS. 2-4 illustrate alternative types of force measuring devices which could be employed in an apparatus of the present invention.

In addition to the elements previously enumerated, the suspension of FIGS. 1 and 2 includes adjustable MacPherson struts 18, having a lower end rigidly attached to wheel carrier 15 and an upper end which passes through suspension unit 20. The upper end of strut 18 extending above suspension unit 20 is resiliently or pivotally attached to the chassis of the vehicle in conventional fashion.

The suspension of FIG. 2 is completed by force sensor 22, which serves to sense the combined force of the road surface inputs and rotational imbalance of the unsprung mass. In this respect, the embodiment of the present invention utilizing the force sensor as disposed in FIG. 2 eliminates the need to measure the sprung mass of the vehicle, and as such, is less complex than the embodiment of FIG. 1. The sensor 22 measures the difference in the sprung vehicle mass due to loading or unloading of the vehicle such as people entering or exiting the vehicle or as the vehicle travels over undulating roads. As may be seen from FIG. 2, this sensing results from the connection of force sensor 22 between chassis 16 and lower control arm 14 such that the motion of lower control arm 14 which accompanies vertical movement of the roadwheel assembly will be accompanied by linear or telescoping motion of sensor 22 which produces a corresponding force within sensor 22 as will be described below. The sensor 22 is very similar to the force operated position sensor described in my U.S. Pat. No. 5,083,454. As described therein, the sensor 22 can be utilized in other vehicle locations as well as within a suspension unit itself.

Those skilled in the art will appreciate in view of this disclosure that although the present suspension system has been described in view of the well-known MacPherson strut configuration, an apparatus according to the present invention could be utilized with a variety of suspension configurations including modified MacPherson strut, Hotchkiss, quadralink, parallel arm, or other types of suspension configurations. It will further be appreciated that an apparatus according to the present invention could be utilized with suspension systems featuring not only controllable damping or controllable ride height, but also also those systems in which both damping and ride height are controlled. Further, the sensor disclosed herein would likely be useful for providing operational data for other types of semi-active or active vehicular suspension systems, including those responding to road undulations, or other types of systems requiring suspension position or suspension velocity information.

As shown in FIGS. 3 and 4, each illustrated embodiment of force sensor 22 includes outer housing 30, having an attachment eye, 32, integral therewith. A similar attachment eye is incorporated into plunger rod 34. The plunger and plunger rod are telescopically or slidably received by outer housing 30. The free end of plunger 36 bears upon an elastically deformable member, which is illustrated as compression spring 38. Other types of elastically deformable members such as those constructed of non-metallic elastomeric compounds could be employed in a sensor according to the present invention.

Plunger 36 bears upon compression spring 38 such that the spring will be compressed as the two halves of the sensor are moved together telescopically. As spring 38 is compressed, force will build within the spring, and this force will be exerted equally upon plunger 36 and upon the transducer means contained within housing 30. As such, the spring and plunger comprise means for generating a force with magnitude related to the combined force exerted between the road and thew sprung vehicle mass. Because it is possible to construct springs which are fairly linear in terms of their force/displacement constant, the force exerted by the spring will be almost directly proportional to the combined force. Those skilled in the art will appreciate in view of this disclosure that a non-linear rate spring could also be used in a sensor according to the present invention.

As previously explained, telescopic movement of sensor 22 accompanies vertical movement of the suspension illustrated in FIG. 2. Accordingly, outer housing 30 and the componentry associated therewith, and plunger 36 and its associated componentry, comprise first and second components which move with respect to one another when the suspension members move with respect to one another.

Alternative transducer means are illustrated in FIGS. 3 and 4. In each case, the transducer means produces a signal related to the magnitude of the force exerted upon the transducer by compression spring 38. In FIG. 3, the transducer is illustrated as comprising pressure capsule 40, having an associated pressure sensor or measuring device, 42 The pressure capsule may be constructed of any suitable metallic or non-metallic material capable of withstanding forces imposed by spring 38.

As the force exerted by spring 38 upon pressure capsule 40 changes, a fluid medium within pressure capsule 40 will be compressed, thereby changing the pressure within the capsule. Such changes will be sensed by pressure sensor 42, which will produce a signal related to the magnitude of the force exerted by spring 38, and ultimately, the combined force due to the sprung vehicle mass, the road surface and the rotational imbalance of the roadwheel assembly exerted between the road and the vehicle sprung mass. Those skilled in the art will appreciate in view of this disclosure that the medium within capsule 40 may comprise a gas or a liquid. The latter may be preferred in certain cases because of the damping a liquid would provide.

Pressure measuring device 42 may comprise any one of a variety of known analog or digital devices operating according to known principles for the purpose of measuring a fluid pressure and for producing a signal which is proportional to said pressure. Examples of such devices include piezoelectric crystal devices, strain gauge diaphragm devices, variable capacitance devices, or other such devices. A discussion of such sensors is found in *Internal Combustion Engines,* International Textbook Company, 1968, at pgs. 147-153, which is hereby incorporated by reference.

In the embodiment shown in FIG. 4, compression spring 38 bears directly upon a plurality of piezoelectric crystals, 44, which crystals comprise the transducer of FIG. 4. It is well known that such crystals have the ability of translating a force or pressure directly into an electrical signal. Thus, as the suspension of FIG. 2 moves in the jounce and rebound directions, spring 38 will be alternately compressed and allowed to expand, such that plunger 36 and spring 38 will exert pressure on crystals 44, with the result that the crystals will generate a signal proportional to the exerted pressure, and hence, proportional to the combined force of the sprung mass, road surface and imbalanced roadwheel assembly. This signal is transmitted to a microprocessor via leads 45.

Figure 5:
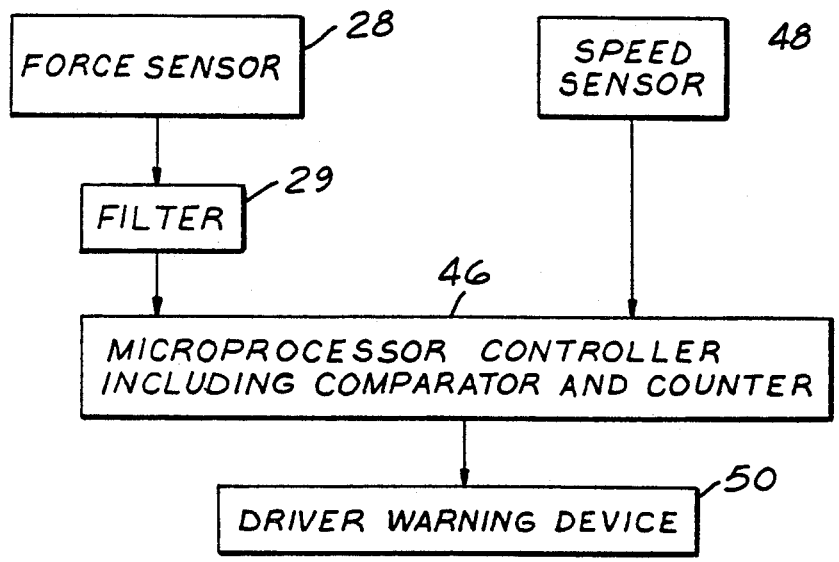
FIG. 5 is a block diagram showing component parts of an apparatus according to the present invention.

FIG. 5 illustrates the major components of a system according to the present invention. Microprocessor controller 46 receives raw combined force data from force sensor 28, which may either comprise a load cell 23 shown in FIG. 1, or force sensor assembly 22 shown in FIGS. 2-4, or any other suitable force sensor, via filter 29, and speed sensor 48. Although many types of automotive speed sensors are known, one type suitable for use with a system according to the present invention comprises a signal generator driven by the powertrain of the vehicle. One such type of signal generator presently used in Ford Motor Company vehicles comprises a variable reluctance alternating current generator which produces a signal having a frequency which is directly proportional to the velocity of the vehicle. Microprocessor controller 46 is shown as sending a signal to driver warning device 50 Those skilled in the art will appreciate in view of this disclosure that microprocessor controller 46 and its associated peripheral equipment to be structured according to several known architectures In a preferred embodiment, however, the microprocessor is configured so that control programs are sequentially read from a read-only memory (ROM) Unit commands are executed by a central processor unit (CPU) Input/Output "I/O" devices, which may be integrated with the microprocessor controller, serve to communicate with the balance of the system One such I/O device could contain signal conditioning circuits such as filter 29. Other I/O devices could include signal frequency counters useful for rejecting spurious signals arising from road inputs. A random access memory (RAM), stores data for use by the CPU. A number of different microprocessors could be used to practice the present invention, such as the model 8096 made by the Intel Corporation or other microprocessors known to those skilled in the art and suggested by this disclosure.

Figure 6A:
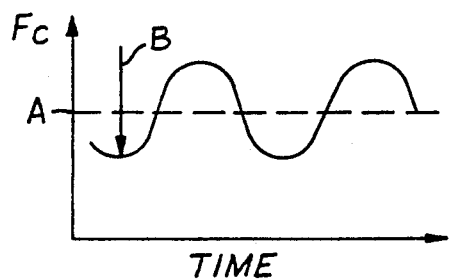
FIGS. 6A and 6B are force plots showing force measured by an apparatus according to the present invention.
Figure 6B:
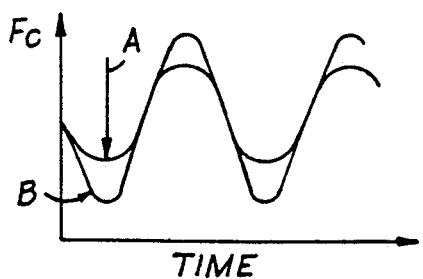

Referring now to FIGS. 6A and 6B, the force signals developed during rotation of the vehicle roadwheel assembly are plotted as a function of time. FIG. 6A shows the force plot assuming the vehicle is traveling on a smooth road having no surface irregularities. Line A represents a base component force. If the load cell illustrated in FIG. 1 is employed by the present invention, the base component is due to the sprung mass of the vehicle and the road surface irregularities. Since there are no irregularities acting against the roadwheel assemblies of the vehicle creating forces, line A is straight due to the sprung mass of the vehicle. An increase or decrease of weight to the sprung vehicle mass, such as with people entering or exiting the vehicle, simply shifts line A about the vertical axis.

Line B in FIG. 6A illustrates variations in force exerted between the road and the sprung mass of the vehicle attributable to dynamic rotational imbalance of a roadwheel assembly. In effect, a static imbalance condition will cause a dynamic imbalance characterized by sinusoidal oscillatory motion of the roadwheel assembly about its spindle as the imbalance rotates with the rotating wheel. The rotation of the imbalance results in a force component directed generally normally to an axis parallel with the longitudinal axis of the vehicle. Line B illustrates the sinusoidal force component due to the imbalanced roadwheel assembly.

FIG. 6B shows a base component force signal, line A, when the vehicle is traveling on an undulating road surface. As before, with the embodiment illustrated in FIG. 1, the base force component results from the sprung mass of the vehicle and the road surface undulations. If the sensor 22 of FIG. 2 is utilized, the base component is due to the road surface undulations and an increase or decrease in sprung vehicle mass due to loading or unloading such as with people entering or exiting the vehicle. As the vehicle roadwheels travel over undulations in the road surface causing jounce and rebound occurrences, the undulations create forces acting against the sprung mass of the vehicle which are sensed by force sensors 22. Line B again represents variations in force exerted between the road and the sprung mass of the vehicle attributable to the dynamic rotational imbalance of a roadwheel assembly. As explained above, with an active suspension system which responds in real time to dampen forces acting against the vehicle sprung mass, the dynamic rotational imbalance of the roadwheel assembly creates forces which are dampened by an active suspension actuator. This leads to an increase in power required by the active suspension system resulting in poorer gas mileage. Therefore, it is important to warn the driver when a roadwheel assembly is out of balance.

Both the frequency and the amplitude of the signals shown in FIGS. 6A and 6B will depend upon the forward velocity of the vehicle. Accordingly, the magnitude of the dynamic rotational force imbalance, $F_I$, is given by the following transfer function:

$$F_I = f(K_1 V_{VEH}, K_2 I_S)$$

where:

K1 and K2 are constants relating to the particular vehicle in question;

$V_{VEH}$ is equal to the forward velocity of the vehicle; and $I_S$ is equal to the magnitude of the static imbalance affecting the roadwheel assembly in question.

Referring now to FIG. 5, an apparatus according to the present invention operates as follows. While running along a roadway, force sensors 28, comprising the force measurement devices 23 or 22 of FIGS. 1 or 2, dynamically measure the combined force exerted between the road and the sprung mass of the vehicle and output a combined force signal. The combined force may be solely due to road surface inputs and rotational imbalance and may also include the unsprung vehicle mass as previously explained. This signal is conditioned by filter 29 which may comprise, for example, a bandpass filter. A bandpass filter is useful with a system according to the present invention because it is necessary to resolve the combined force signal into a base component corresponding to the force exerted between the road and the vehicle due to either the vehicle sprung mass and the road surface inputs or solely to road surface inputs. The filter 29 further resolves the combined signal into a variable component attributable to the dynamic rotational imbalance of the roadwheel assembly under consideration as shown in FIGS. 6A and 6B. The high pass portion of a bandpass filter will eliminate the voltage offset arising from the force level, whereas the low pass portion of a bandpass filter will eliminate undesirable high frequency signals, such as electronic noise, from a sensor system according to the present invention. If desired, the filter could be implemented in software within microprocessor controller 46 according to known techniques. The magnitude of the filtered signal may be measured by any one of a variety of means known to those skilled in the art and suggested by this disclosure. Then, microprocessor controller 46 may apply a derivation of the transfer function set forth above to calculate $I_S$. If it is desired to calculate the actual magnitude of the imbalance, the following equation may be used:

$$I_S = \frac{F_I}{K_3 V_{VEH}}$$

The equation for $I_S$ shows that the magnitude of the imbalance is a function of the measured combined force and the vehicle velocity, with constant $K_3$ operating as a correction factor for the particular vehicle in question.

Those skilled in the art will appreciate that inputs to the combined force transducers arising from imperfections in a roadway surface could give rise to a spurious imbalance signal, simply because such imperfections may tend to "kick" the roadwheel assemblies toward or away from the vehicle sprung mass with a frequency emulating that of an imbalance condition. Accordingly, it is desirable for microprocessor controller 46 to eliminate such spurious signals by comparing the frequency of the velocity signal to the frequency of the variable component of the combined force. This may be done by counting the frequencies of both signals. In the event that the counted frequencies are not sufficiently alike so as to fall within a common tolerance band, the microprocessor controller will reject the combined force signal as being the spurious offspring of road inputs, rather than roadwheel assembly imbalance. Thereafter, the system will await data which is not tainted by road inputs.

Once the magnitude of the imbalance has been calculated, microprocessor controller 46 may output a driver warning signal by means of driver warning device 50 in the event the magnitude of the imbalance exceeds a threshold value which may be a function of the velocity of the vehicle. Alternatively, the actual magnitude of the imbalance may be stored in the RAM for retrieval by a vehicle repair technician at a later date. This will allow the technician to know the magnitude of the imbalance and to diagnose the cause of the imbalance as originating in the roadwheel assembly, associated rotating members, or a combination thereof and as such provides a diagnostic tool for the technician.

In the circumstance that it is not desired to calculate the precise magnitude of the imbalance, the vehicle velocity need not be employed in the calculation for $I_S$, it being necessary to compare the measured force with a predetermined threshold band having a minimum value which is sufficiently great so that a trivial imbalance will not cause the variable component of the combined force signal to exceed such minimum level at expected vehicle operating speeds, but having a maximum value which is less than the magnitude of the inputs expected from rough, deteriorated, road surfaces. In the event that magnitude of the variable component of the combined force falls outside of such threshold band, microprocessor controller 46 will reject the signal as being spurious. This technique will preferably be combined with a frequency counting technique in which variations in the frequency of the variable component of the steering force are noted, with excessive variation being used as a basis for rejecting the steering force signal. According to this technique, the frequency of the variable force component will be counted by a counter within microprocessor controller 46 over successive periods of time. If the frequency change from one period to a later period is in excess of a predetermined value, the microprocessor controller will reject the force signal as being spurious. In sum, the force signal will be rejected if either the magnitude or the frequency variation of the force signal is not within predetermined tolerances.

Various modifications and variations will no doubt occur to those skilled in the arts to which this invention pertains. All such modifications and variations which basically rely on the teachings with which this disclosure as advanced the art are properly considered within the scope of this invention as defined by the following claims.

I claim:

1. An apparatus for detecting rotational imbalance of a roadwheel assembly of a vehicle having a sprung and unsprung mass, comprising:
    force measurement means for sensing a combined force exerted between the road upon which the vehicle is traveling and said sprung mass of said vehicle, said combined force including forces due to the sprung vehicle mass, road surface inputs and the rotational imbalance of said roadwheel assembly, said force measurement means comprising means for generating a combined force signal corresponding to said sensed combined force; and
    processor means responsive to said combined force signal for determining the dynamic rotational balance condition of said roadwheel assembly.

2. An apparatus according to claim 1, wherein said force measurement means comprises a force transducer interposed between said sprung and unsprung masses of said vehicle operative to sense said combined force due to said sprung vehicle mass, road surface inputs and said rotational imbalance of said roadwheel assembly 3. An apparatus according to claim 1, wherein said force measurement means comprises a load cell interposed between said sprung and unsprung masses of said vehicle operative to sense said combined force due to said sprung vehicle mass, road surface inputs and said rotational imbalance of said roadwheel assembly.

4. An apparatus according to claim 1, wherein said force measurement means comprises a sensor interposed between two suspension members of said vehicle, said suspension members being relatively movable with respect to one another, said sensor comprising:
    a first sensor component movable with respect to a second sensor component;
    means for attaching said first and second sensor components to said suspension members so that said first and second sensor components will be caused to move with respect to one another when said suspension members move with respect to one another;
    said first sensor component comprising a housing with a force transducer means situated therein, with said transducer means being adapted to generate a signal proportional to a force imposed upon said transducer means; and
    said second sensor component comprising a plunger telescopically received in said housing and bearing upon an elastically deformable member in contact with said force transducer means, whereby said plunger and said elastically deformable member will exert a force upon said transducer means representative of said sensed combined force.

5. An apparatus according to claim 4, wherein said transducer means comprises a piezoelectric device.

6. An apparatus according to claim 4, wherein said transducer means comprises a pressure sensor which measures the pressure within a pressure vessel operatively associated with said elastically deformable member.

7. An apparatus according to claim 4, wherein said elastically deformable member comprises a compression spring.

8. An apparatus according to claim 1, wherein said processor means comprises:
    means for resolving said combined force signal into a base component and a variable component attributable to dynamic rotational imbalance of said roadwheel assembly.

9. An apparatus according to claim 8, wherein said force measurement means is operative to measure said base force component which corresponds to the force exerted between the road upon which the vehicle is traveling and the sprung mass of said vehicle.

10. An apparatus according to claim 8, wherein said force measurement means is operative to measure said base force component corresponds to the force exerted between the road upon which the vehicle is traveling and the difference in the sprung mass of the vehicle due to loading.

11. An apparatus according to claim 8, wherein said means for resolving said combined force signal comprises a bandpass filter.

12. An apparatus according to claim 8, wherein said processor means further comprises means for comparing the magnitude of said variable force component to a predetermined threshold value as well as counter means for determining variations in the frequency of said variable force component, so that said force signal may be rejected by said processor as a spurious signal in the event that either the magnitude or the frequency variation of said force signal is not within predetermined tolerances.

13. An apparatus according to claim 8, wherein said processor means further comprises comparator means for comparing the magnitude of said variable component to a threshold value, with said processor means further comprising means for providing an imbalance signal in the event that said variable component exceeds said threshold value.

14. An apparatus for measuring the rotational imbalance of a roadwheel assembly of a vehicle having a sprung and unsprung mass, comprising:

force measurement means for sensing a combined force exerted between the road upon which the vehicle is traveling and said vehicle sprung mass, said combined force including forces due to the sprung vehicle mass, road surface inputs and the rotational imbalance of said roadwheel assembly, said force measurement means further comprising means for generating a combined force signal corresponding to said sensed force;

means for measuring the forward velocity of said vehicle and for generating a signal corresponding to said velocity; and processor means, responsive to said combined force signal and to said velocity signal, for determining the dynamic rotational balance condition of said roadwheel, said processor means comprising:

means for resolving said combined force signal into a base component and a variable component attributable to dynamic rotational imbalance of said roadwheel assembly; and means for calculating the magnitude of said variable component to a threshold value, with said comparator means further comprising means for providing an imbalance signal in the event that said variable component exceeds said threshold value.

15. An apparatus according to claim 14, wherein said means for resolving said combined force signal comprises a bandpass filter.

16. An apparatus according to claim 14, wherein said processor means further comprises counter means for comparing the frequencies of said velocity signal and the variable component of said force signal, and means for rejecting the force signal as a spurious signal in the event that said frequencies are not within a common frequency tolerance band.

17. A method for detecting dynamic imbalance of a roadwheel assembly of a vehicle having a sprung and unsprung mass, comprising:

sensing a combined force exerted between the surface upon which the vehicle is traveling and the sprung vehicle mass, said combined force including forces due to the sprung vehicle mass, road surface inputs and the rotational imbalance of said roadwheel assembly;

generating a combined force signal having a magnitude corresponding to said sensed combined force;

resolving said combined force signal into a base component and a variable component attributable to dynamic rotational imbalance of said roadwheel assembly;

comparing the magnitude of said variable force component to a threshold value; and providing an imbalance signal in the event that said variable force component exceeds said threshold value.

18. A method according to claim 17 wherein said threshold value is determined as a function of the forward velocity of said vehicle.

19. A method according to claim 17, wherein the step of resolving said combined force signal into a base component further includes the step of resolving said base component into a component due to road surface inputs and the difference of said sprung vehicle mass due to loading.

20. A method according to claim 17, wherein the step of resolving said combined force signal into a base component further includes the step of resolving said base component into a component due to said sprung mass of said vehicle and road surface inputs.

* * * * *